US012149981B2

(12) United States Patent
Tesanovic et al.

(10) Patent No.: US 12,149,981 B2
(45) Date of Patent: Nov. 19, 2024

(54) METHOD AND APPARATUS FOR MAPPING BACKHAUL CHANNELS IN A WIRELESS SYSTEM

(71) Applicant: Samsung Electronics Co., Ltd., Suwon-si (KR)

(72) Inventors: Milos Tesanovic, Suwon-si (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 17/753,030

(22) PCT Filed: Aug. 13, 2020

(86) PCT No.: PCT/KR2020/010724
§ 371 (c)(1),
(2) Date: Feb. 15, 2022

(87) PCT Pub. No.: WO2021/029687
PCT Pub. Date: Feb. 18, 2021

(65) Prior Publication Data
US 2022/0295335 A1    Sep. 15, 2022

(30) Foreign Application Priority Data

Aug. 15, 2019  (GB) ...................................... 1911716

(51) Int. Cl.
*H04W 28/02*    (2009.01)
(52) U.S. Cl.
CPC .............................. *H04W 28/0263* (2013.01)

(58) Field of Classification Search
CPC .................................................. H04W 28/0263
USPC .......................................................... 370/329
See application file for complete search history.

(56) References Cited

U.S. PATENT DOCUMENTS 8,971,233 B2 *  3/2015  Moberg ............... H04W 76/11
                                                              455/449
2022/0272564 A1 *  8/2022  Teyeb ................... H04W 76/11

FOREIGN PATENT DOCUMENTS

| WO | 2020/221360 A1 | 11/2020 |
| WO | 2021/006783 A1 | 1/2021 |
| WO | 2021/006784 A1 | 1/2021 |
| WO | 2021/006789 A3 | 1/2021 |

OTHER PUBLICATIONS

R3-192525 (Year: 2019).*
R2-1906348 (Year: 2019).*
R2-1906969 (Year: 2019).*
R2-1907006 (Year: 2019).*
International Search Report and Written Opinion of the International Searching Authority in connection with International Application No. PCT/KR2020/010724 issued Nov. 3, 2020, 9 pages.

(Continued)

*Primary Examiner* — Intekhaab A Siddiquee

(57) ABSTRACT

In an exemplary embodiment, a method of a distributed unit (DU) in a wireless communication system is provided. The method comprises receiving information from a central unit (CU), identifying a bearer or group of bearers based on the information, and assigning the bearer or group of bearers to a backhaul channel.

12 Claims, 10 Drawing Sheets

(56) References Cited

OTHER PUBLICATIONS

Huawei et al., "Bearer mapping in IAB network", R2-1906969, 3GPP TSG RAN WG2 #106, Reno, USA, May 13-17, 2019, 3 pages.
Ericsson, "Layer 2 Structure for IAB nodes", R2-1907006, 3GPP TSG RAN WG2 Meeting #106, Reno, NV, USA, May 13-17, 2019, 6 pages.
KDDI Corporation, "Open issues for BAP-layer bearer mapping", R2-1906084, 3GPP TSG-RAN WG2 Meeting #106, Reno, USA, May 13-17, 2019, 4 pages.
Qualcomm Incorporated, "IAB transport at IAB-donor DU", R3-192478, 3GPP TSG-RAN WG3 Meeting #104, Reno, NV, USA, May 13-17, 2019, 4 pages.
Samsung, "Modelling of BAP layer", R2-1906965 (was R2-1903681), 3GPP TSG-RAN WG2 Meeting #106, Reno, NV, USA, May 13-17, 2019, 5 pages.
The Intellectual Property Office of the United Kingdom, "Written Opinion" issued Nov. 22, 2019, in connection with United Kingdom Patent Application No. 1911716.7, 3 pages.
ZTE Corp et al., "Consideration on user plane bearer mapping" 3GPP TSG RAN WG3 Meeting #104, R3-192525, Reno, NV, USA, May 13-17, 2019, 4 pages.
Intel Corp., "Bearer Mapping—further details" 3GPP TSG RAN WG2 Meeting #106, R2-1906348, Reno, U.S.A., May 13-17, 2019, 5 pages.
Huawei, "OAM Connectivity for IAB node" 3GPP TSG-RAN WG3 Meeting #104, R3-192804, Reno, Nevada, USA, May 13-17, 2019, 2 pages.
The Intellectual Property Office of the United Kingdom, "Examination Report under Section 18(3)" issued Nov. 25, 2021, in connection with United Kingdom Patent Application No. 1911716.7, 2 pages.
The Intellectual Property Office of the United Kingdom, "Search Report under Section 17" issued Jan. 22, 2020, in connection with United Kingdom Patent Application No. 1911716.7, 2 pages.
United Kingdom Intellectual Property Office, "Search Report under Section 17," issued May 18, 2022, in connection with United Kingdom Patent Application No. GB2206742.5, 4 pages.
European Patent Office, "Supplementary European Search Report," dated Sep. 2, 2022, in connection with European Patent Application No. 20852982.6, 11 pages.
Communication pursuant to Article 94(3) EPC dated Jun. 25, 2024, in connection with European Patent Application No. 20852982.6, 4 pages.

\* cited by examiner

FIG. 4

| Offsets | Octet | | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | Traffic Class | | | | | | | | Flow Label | | | | | | | | | | | | | | | | | | | |
| 4 | 32 | Payload Length | | | | | | | | | | | | | | | Next Header | | | | | | | | Hop Limit | | | | | | | |
| 8 | 64 | Source Address | | | | | | | | | | | | | | | | | | | | | | | | | | | | | | | |
| 12 | 96 | | | | | | | | | | | | | | | | | | | | | | | | | | | | | | | | |
| 16 | 128 | | | | | | | | | | | | | | | | | | | | | | | | | | | | | | | | |
| 20 | 160 | | | | | | | | | | | | | | | | | | | | | | | | | | | | | | | | |
| 24 | 192 | Destination Address | | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

Fixed header format

METHOD AND APPARATUS FOR MAPPING BACKHAUL CHANNELS IN A WIRELESS SYSTEM

CROSS-REFERENCE TO RELATED APPLICATIONS

This application is a 371 of International Application No. PCT/KR2020/010724, filed Aug. 13, 2020, which claims priority to United Kingdom Patent Application No. 1911716.7, filed Aug. 15, 2019, the disclosures of which are herein incorporated by reference in their entirety.

BACKGROUND

1. Field

The present disclosure relates to wireless communication systems. More particularly, the present disclosure relates to bearer mapping.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In an exemplary embodiment, A method of a distributed unit (DU) in a wireless communication system is provided. The method comprises receiving information from a central unit (CU), identifying a bearer or group of bearers based on the information, and assigning the bearer or group of bearers to a backhaul channel.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a packet header structure according to IPv6 according to embodiments of the present disclosure;

DETAILED DESCRIPTION

Figure 1:
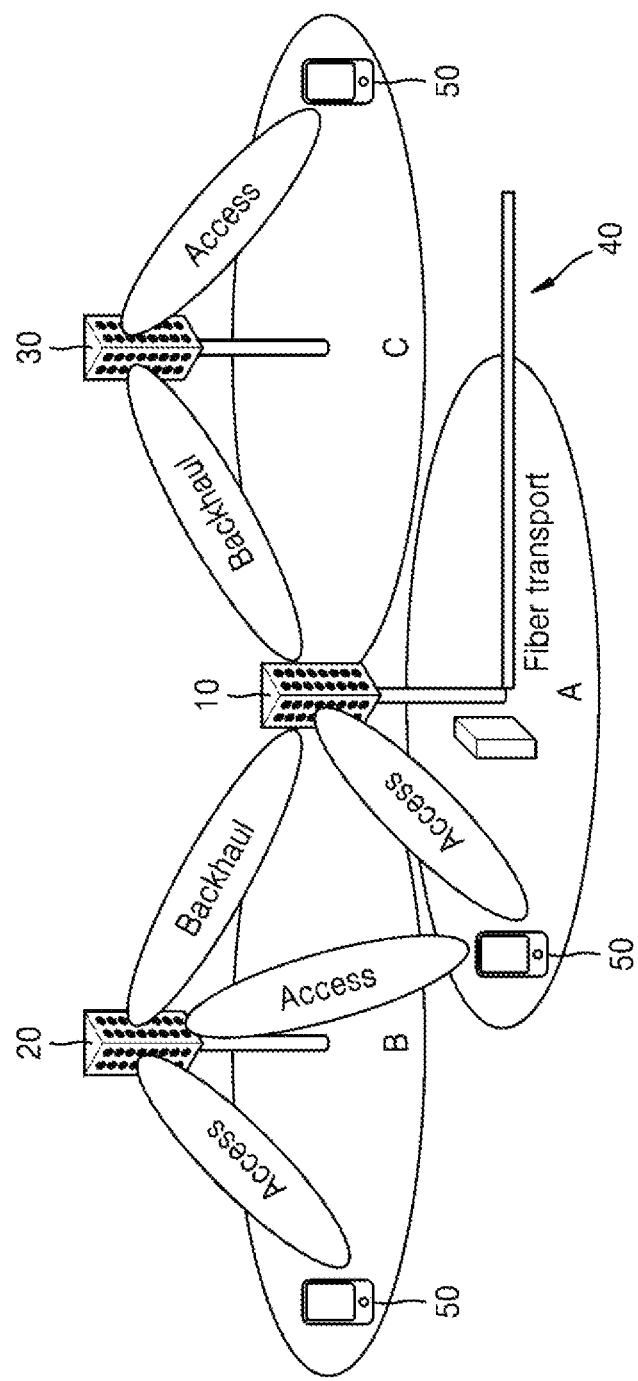
FIG. 1 illustrates a representation of part of a network employing IAB according to embodiments of the present disclosure.

In an embodiment, a method of mapping a bearer or group of bearers to a backhaul channel, at a Distributed Unit, DU, in an Integrated Access and Backhaul, IAB, network is provided. The method comprising the step of: identifying a bearer or a group of bearers using information received from an associated Central Unit, CU, included in a packet header in one of a plurality of possible fields, wherein the plurality of possible fields includes: DS/DSCP, ECN, TOS/TC and Flow Label; and assigning the bearer or group of bearers to a backhaul channel.

In an embodiment, wherein the step of identifying is based on GTP tunnel ID, TEID, of the bearer.

In an embodiment, wherein the step of identifying the bearer or a group of bearers uses information included in a packet header in more than one of the plurality of possible fields.

In an embodiment, wherein the more than one of the plurality of possible fields includes one of the combinations: Flow Label field and TC field; Flow Label field and DS field; Flow Label field and ECN field; DSCP field and ECN field; and DS field and ECN field.

In an embodiment, wherein the step of identifying the bearer or a group of bearers further comprises the further step of indicating an action associated with the bearer or group of bearers.

In an embodiment, wherein: the DS/DSCP field identifies the bearer or group of bearers and the ECN field indicates the action; or the DS field or TC field identifies the bearer or group of bearers and the Flow Label field indicates the action; or the Flow Label field identifies the bearer or group of bearers and the DS field or TC field indicates the action.

In an embodiment, wherein the action includes one or more of the following: assigning a high priority; assigning a low priority; assigning a QoS class; randomizing flow; and assign a redundancy status In an embodiment, wherein identifying a group of bearers comprises grouping on the basis of QoS requirements.

In an embodiment, wherein information on which of the plurality of possible fields comprises which information is indicated by means of a reserved value of one or more of the fields themselves or by a flag.

In an embodiment, wherein the DU is one of a donor DU or an IAB DU.

In an embodiment, wherein if the DU is part of an IAB node, the full information, or a subset of information thereof, from the DS/DSCP or TC/TOS field and/or flow label, as applicable, is inserted into a BAP header.

In an embodiment, wherein a donor Central Unit, CU, configures a donor DU and all intermediate nodes on what the full information in the BAP header represents.

In an embodiment, wherein if the DU is part of an IAB node, the bearer identifying information from the DS/DSCP or TC/TOS field and/or flow label, as applicable, is inserted into a BAP header.

In an embodiment, wherein the donor DU configures additional information for the BAP header, based on bearer identity.

In an embodiment, wherein the donor CU configures the donor DU and all intermediate nodes with additional information, which is mapped to bearer ID contained in the BAP header at the intermediate nodes.

In an embodiment, a method of a distributed unit (DU) in a wireless communication system is provided. The method comprising: receiving information from a central unit (CU); identifying a bearer or group of bearers based on the information; and assigning the bearer or group of bearers to a backhaul channel.

In an embodiment, wherein the bearer or the group of bearers is identified based on a GTP(GPRS Tunnelling Protocol) tunnel ID of the bearer.

In an embodiment, wherein the information is included in a packet header.

In an embodiment, wherein the bearer or the group of bearers are identified based on at least one of information of Flow Label field, Differentiated Services (DS) field, Differentiated Services Code Point (DSCP) field, Traffic Class (TC) field or Explicit Congestion Notification (ECN) field in a packet.

In an embodiment, wherein the DU is included in a donor base station (BS) in an integrated access and backhaul (IAB) network.

In an embodiment, a method of a central unit (CU) in a wireless communication system is provided. The method comprising: transmitting information to a distributed unit (DU); and wherein a bearer or group of bearers is identified based on the information; and wherein the bearer or group of bearers is assigned to a backhaul channel.

In an embodiment, wherein the bearer or the group of bearers is identified based on a GTP(GPRS Tunnelling Protocol) tunnel ID of the bearer.

In an embodiment, wherein the information is included in a packet header.

In an embodiment, wherein the bearer or the group of bearers are identified based on at least one of information of Flow Label field, Differentiated Services (DS) field, Differentiated Services Code Point (DSCP) field, Traffic Class (TC) field or Explicit Congestion Notification (ECN) field in a packet.

In an embodiment, wherein the DU and CU are included in a donor base station (BS) in an integrated access and backhaul (IAB) network.

MODE FOR INVENTION

Other technical features may be readily apparent to one skilled in the art from the following figures, descriptions, and claims.

According to the present disclosure there is provided an apparatus and method as set forth in the appended claims. Other features of the disclosure will be apparent from the dependent claims, and the description which follows.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

In an exemplary embodiment according to the present disclosure, methods for identifying bearer and mapping to backhaul channels are provided.

FIGS. 1 through 10, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'base station' can refer to any component (or collection of components) configured to provide wireless access to a network, such as a transmit point (TP), a TRP, a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

A 5G communication system can be implemented in higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication on sidelink, wireless backhaul, moving network, cooperative communication, Coordinated Multi-Point (CoMP) transmissions/receptions such as from multiple TRPs, reception-end interference cancellation and the like.

The discussion of 5G systems and frequency bands associated therewith is for reference as certain embodiments of the present disclosure can be implemented in 5G systems. However, the present disclosure is not limited to 5G systems or the frequency bands associated therewith, and embodiments of the present disclosure can be utilized in connection with any frequency band.

FIG. 1 illustrates a representation of part of a network employing Integrated Access and Backhaul (IAB) according to embodiments of the present disclosure.

According to the present disclosure, method and apparatus for improvements in and relating to bearer identification and mapping may be provided. The present disclosure relates to bearer mapping. It particularly relates to bearer mapping in an Integrated Access and Backhaul (IAB) network. The bearer or groups of bearers (1:1 or N:1) are mapped onto a backhaul channel. IAB nodes are used in Fifth Generation (5G) or New Radio (NR) networks in particular but may have other applications.

Such an IAB configuration is shown in FIG. 1. Here, nodes are used as relay nodes (rTRP) for the extension of wireless backhaul links up to a node which has a fibre/wired backhaul connection.

In FIG. 1, there are three nodes 10, 20, 30, each connected to one or more UEs 50. Node 10 is provided with a fibre connection 40 to the core network. Nodes 20, 30 do not have such a wired connection and make use of the access spectrum to provide backhaul connections to the wired base station 10, which then transmits/receives the required data to/from the core network.

By means of such a configuration, it is possible to install nodes without the necessity of providing a fibre data connection, thereby allowing speedy and simple roll out of base stations to locations where no such data connection is available or possible.

Figure 2:
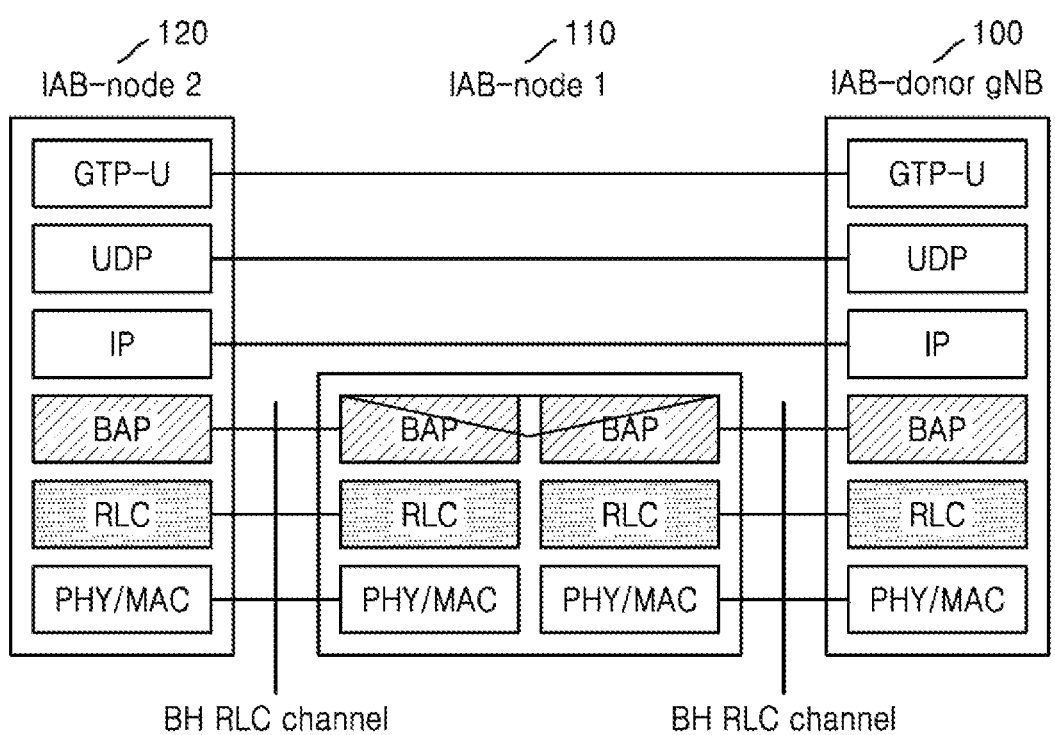
FIG. 2 illustrates a protocol stack illustrating Backhaul Adaptation (BAP) according to embodiments of the present disclosure.

FIG. 2 illustrates a protocol stack illustrating Backhaul Adaptation (BAP) according to embodiments of the present disclosure.

In standardization discussions, a new protocol layer has been defined, known as the Backhaul Adaptation Layer (BAP). Its relationship with other, known, layers is shown in FIG. 2, where the BAP layer is illustrated between the IP (Internet Protocol) and RLC (Radio Link Control) layers of the protocol stack.

FIG. 2 shows the relative interconnections between an IAB Donor gNB 100, a first IAB node 110 and a second IAB node 120. The Backhaul RLC channel is shown between the donor gNB 100 and the first IAB node 110, and also between the first IAB node 110 and the second IAB node 120. The FIG. 2 shows how F1-U is carried over two backhaul hops.

Figure 3:
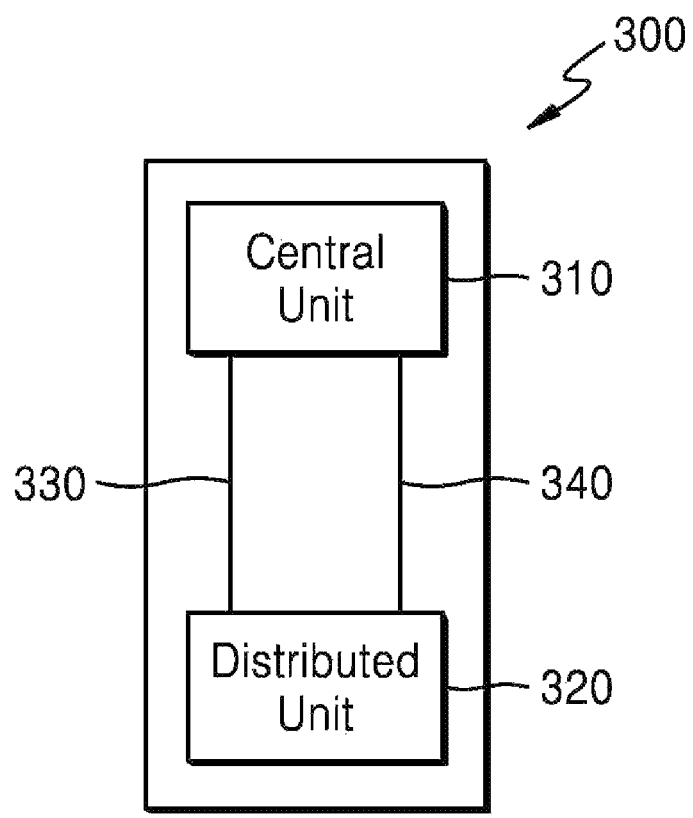
FIG. 3 illustrates a gNB having a CU and DU according to embodiments of the present disclosure.

FIG. 3 illustrates a gNB having a CU and DU according to embodiments of the present disclosure.

FIG. 3 shows a gNB having a CU and DU. FIG. 3 shows a gNB 300. In the gNB 300, two main functional units may be categorised as a central unit (CU) 310 and a distributed unit (DU) 320. A gNB 300 may have more than one DU associated with a given CU, located relatively distant from the CU. The interface between the CU and a respective DU is known as the F1 interface. The F1 interface may be subdivided into F1-U interface 330 and F1-C interface 340, based on User plane and Control plane functionalities, respectively.

The primary purpose of the BAP is to transport the F1-U interface 330 across the wireless backhaul.

FIG. 3 illustrates how a donor gNB is split into CU 310 and DU 320, as mentioned above. The gNB-DU functionality terminates NR access to UEs and IAB nodes and supports F1 protocol to the gNB-CU on the IAB-donor.

In standardization discussions, various agreements/assumptions have been made. These agreements/assumptions include adopting IPv6 Flow Labels for 1:1 mapping (in conjunction with IAB node IP address). For N:1 mapping, both DSCP-based and IPv6 flow-label based mapping may be used in the donor DU for downlink (DL), with both coexisting in the same network.

In accordance with standardization discussions, GTP Tunnel id, which uniquely identifies each bearer under the same CU, is mapped to the IPv6 Flow Label at the CU. In the case of 1:1 mapping of bearers to backhaul RLC channels, the DU then uses the IPv6 Flow Label field to differentiate among bearers.

However, an issue arises in the use of the Flow Label field and in whether additional fields in the IPv6 headers are used to aid mapping. In the case of N:1 mapping, there is even less conformity and matters are not yet agreed at a standardization level. Furthermore, it has not been agreed whether the mapping (at the donor DU) information referred to above is inserted into the BAP header for use by intermediate nodes.

In an IPv4 environment, the Flow Label field is not available and so different but related issues apply.

The issues referred to above, as well as others not explicitly mentioned, are addressed by embodiments of the present disclosure.

According to a first aspect of the present disclosure, there is provided a method of mapping a bearer or group of bearers to a backhaul channel, at a Distributed Unit (DU), in an Integrated Access and Backhaul (IAB) network, comprising the step of: identifying a bearer or a group of bearers using information received from an associated Central Unit (CU) included in a packet header in one of a plurality of possible fields, wherein the plurality of possible fields includes: Differentiated Services (DS)/Differentiated Services Code Point (DSCP), Explicit Congestion Notification (ECN), Type of Service (TOS)/Traffic Class (TC) and Flow Label; and assigning the bearer or group of bearers to a backhaul channel.

In an embodiment, the step of identifying is based on GTP tunnel ID, TED, of the bearer. For instance, one or more of the following map apply: bearer ID identical to the tunnel ID; bearer ID equal to the N most/least significant bits of the tunnel ID; bearer ID representing QoS of bearer, where this case is applicable to both 1:1 and N:1 mappings.

In an embodiment, the step of identifying the bearer or a group of bearers uses information included in a packet header in more than one of the plurality of possible fields.

In an embodiment, the more than one of the plurality of possible fields includes one of the combinations: Flow Label field and TC field; Flow Label field and DS field; Flow Label field and ECN field; DSCP field and ECN field; and DS field and ECN field.

In an embodiment, the step of identifying the bearer or a group of bearers further comprises the further step of indicating an action associated with the bearer or group of bearers.

In an embodiment: the DS/DSCP field identifies the bearer or group of bearers and the ECN field indicates the action; or the DS field or TC field identifies the bearer or group of bearers and the Flow Label field indicates the action; or the Flow Label field identifies the bearer or group of bearers and the DS field or TC field indicates the action.

In an embodiment, the action includes one or more of the following: assigning a high priority; assigning a low priority; assigning a QoS class; randomizing flow; and assign a redundancy status In an embodiment, identifying a group of bearers comprises grouping on the basis of QoS requirements.

In an embodiment, information on which of the plurality of possible fields comprises which information is indicated by means of a reserved value of one or more of the fields themselves or by a flag.

In an embodiment, the DU is one of a donor DU or an IAB DU.

In an embodiment, if the DU is part of an IAB node, the full information, or a subset of information thereof, from the DS/DSCP or TC/TOS field and/or flow label, as applicable, is inserted into a BAP header.

In an embodiment, a donor Central Unit, CU, configures a donor DU and all intermediate nodes on what the full information in the BAP header represents.

In an embodiment, if the DU is part of an IAB node, the bearer identifying information from the DS/DSCP or TC/TOS field and/or flow label, as applicable, is inserted into a BAP header In an embodiment, the donor DU configures additional information for the BAP header, based on bearer identity.

In an embodiment, the donor CU configures the donor DU and all intermediate nodes with additional information, which is mapped to bearer ID contained in the BAP header at the intermediate nodes.

It should be noted that, depending on the context, certain terms are used in IPv4 and IPv6 to relate to the same or substantially the same features. For instance, in IPv4, the Type of Service (TOS) field includes sub fields Differentiated Services Code Point (DSCP) and Explicit Congestion Notification (ECN). In IPv6, the Traffic Class (TC) field includes sub fields Differentiated Services (DS) and Explicit Congestion Notification (ECN). In effect, TC and TOS are equivalents in the different versions of the standard. Similarly, DS and DSCP are equivalents in the different versions of the standard. References to TOS should, where appropriate, depending upon context, be understood to refer equally to TC and vice-versa. Similarly, references to DSCP should, where appropriate, depending upon context, be understood to refer equally to DS and vice-versa. Where reference is made to TOS/TC or DSCP/DS, it is to be understood that the terminology appropriate to the relevant version of the standard is intended.

In an embodiment of the present disclosure, in the case of 1:1 bearer mapping, bearer mapping is performed at the Donor DU, whereby the flow label field (only present in IPv6 systems) is used to uniquely identify a bearer. This provides a sufficient bearer space size. However, since the IPv6 header also includes TC/TOS (Traffic Class or Type of Service) field, which in turn comprises DSCP and ECN fields, each of which may be available for purposes other than their original ones, the flow label field combined with the TC/TOS field or a part of the TC/TOS field (i.e. just DSCP or just ECN) can also be used to uniquely identify a bearer.

Furthermore, in a case where the flow label uniquely identifies a bearer, reserved values of DS/DSCP or TC/TOS may be used to indicate certain specific actions. For example, the TC/TOS field or a part of the TC/TOS field can indicate priority levels (e.g. this packet should be prioritized in cases of congestion or dropped if needed), QoS class, randomization (e.g. this packet can go via any available path for the specific destination), packet duplication.

In IPv4 networks, the flow label field does not exist. In IPv4 networks it is therefore possible to use the DSCP field to uniquely identify a bearer. It should be noted that this method is not limited to IPv4 networks but is perhaps more applicable in this scenario due to absence of flow label.

Additionally, the DSCP field combined with ECN field can be used to uniquely identify a bearer. Alternatively, rather than being used as part of the bearer ID, it is possible to indicate specific actions using reserved values of the ECN field. For example, the ECN field may be used to indicate priority levels (e.g. this packet should be prioritized in cases of congestion or dropped if needed), QoS class, randomization (e.g. this packet can go via any available path for the specific destination), packet duplication.

In the case of N:1 bearer mapping, the DS/DSCP field can be used to group together multiple bearers for transmission over the same BH RLC channel, e.g. based on the same/similar QoS requirements. Using the same reasoning applied to the ECN case above, in the case of IPv6 systems where the DS/DSCP field (or the TC/TOS field) is used to group together multiple bearers, the flow label field may, in this case, indicate priority levels (e.g. this packet should be prioritized in cases of congestion or dropped if needed), QoS class, randomization (e.g. this packet can go via any available path for the specific destination), packet duplication.

In IPv6 systems, it is also possible to use the flow label for the N:1 mapping case, and the TC/TOS or DS/DSCP fields to indicate special conditions or actions. This may be considered, essentially, as the inverse approach to the one detailed above.

In other words, an embodiment provides bearer mapping at the Donor DU whereby the flow label field is used to group together multiple bearers for transmission over the same BH RLC channel e.g. based on QoS requirements. Reserved values of DS/DSCP or TC/TOS field can be used to indicate one or more of specific actions to be taken with the packets of the aggregated bearers.

In a broad form it is possible to define an embodiment of the present disclosure according to one of the following statements:
  a. Either DSCP/ECN/TOS or flow label indicates bearer identity or the identity of a group of bearers
  b. DSCP/ECN/TOS and flow label combined indicate bearer identity or the identity of a group of bearers
  c. DSCP/ECN/TOS and flow label combined indicate bearer identity and additional information
In the IPv4-specific case:
  a. Either DSCP or ECN indicate bearer identity or the identity of a group of bearers
  b. DSCP and ECN combined indicate bearer identity or the identity of a group of bearers
  c. DSCP and ECN combined indicate bearer identity and additional information The specific option (a/b/c) above is indicated by a reserved value of the DCSP/TOS/ECN field, or a reserved value of the flow label, or a flag. The additional information could further include: QoS class, priority, information that this packet is being retransmitted, instruction to duplicate the packet, number of hops this packets needs to traverse to its destination.

Embodiments thus far have focused on operation at the Donor node. However, embodiments also relate to intermediate nodes in the IAB network which follow the same procedures as those detailed for the Donor DU above. This can be achieved by inserting the full information from the DS/DSCP or TC/TOS field and/or flow label (as applicable/needed) into the BAP header. It can also be achieved by inserting a subset of the information from the DS/DSCP or TC/TOS field (as applicable/needed) and/or flow label into the BAP header, e.g. just the bearer ID or just the additional information.

The most straightforward method of configuring the BAP header, according to above scenarios involves the flow label field (plus any additional info) being set by donor CU and copied into the BAP header. The donor CU configures donor DU and all intermediate nodes on what the flow label (plus additional info) in the BAP header represents.

Embodiments of the disclosure include the case where the donor DU (based on flow label plus any additional info) configures the additional information for the BAP header based on the mapping information. Additionally, the donor CU configures the donor DU and all intermediate nodes with additional information (which can change from node to node), which is mapped to bearer ID contained in the BAP header at the intermediate nodes.

According to a further aspect of the present disclosure, there is provided a method of mapping a bearer or group of bearers, in an IPv6 environment, at a Distributed Unit, DU, in an Integrated Access and Backhaul, IAB, network, comprising the step of: identifying a bearer or a group of bearers using information included in a packet header in a Traffic Class field or a Flow Label field.

According to a still further aspect of the present disclosure, there is provided a method of mapping a bearer or group of bearers, in an IPv4 environment, at a Distributed Unit, DU, in an Integrated Access and Backhaul, IAB, network, comprising the step of: identifying a bearer or a group of bearers using information included in a packet header in a DSCP or ECN field.

FIG. 4 illustrates a packet header structure according to IPv6 according to embodiments of the present disclosure. According to an embodiment of the present disclosure, there is provided a method of bearer mapping at the DU of a donor gNB, whereby the Flow Label field, present in the packet header in IPv6, is used to uniquely identify a bearer. In a further embodiment, the Flow Label field is combined with all or part of the Traffic Class (TC) field to uniquely identify a bearer. Sub fields within the TC field are the Differentiated Services (DS) field comprising 6 bits and the Explicit Congestion Notification (ECN) field comprising 2 bits.

FIG. 4 shows a representation of the header of a data packet according to IPv6. The 8 bits which form Traffic Class (TC), comprising DS and ECN are shown.

Figure 5:
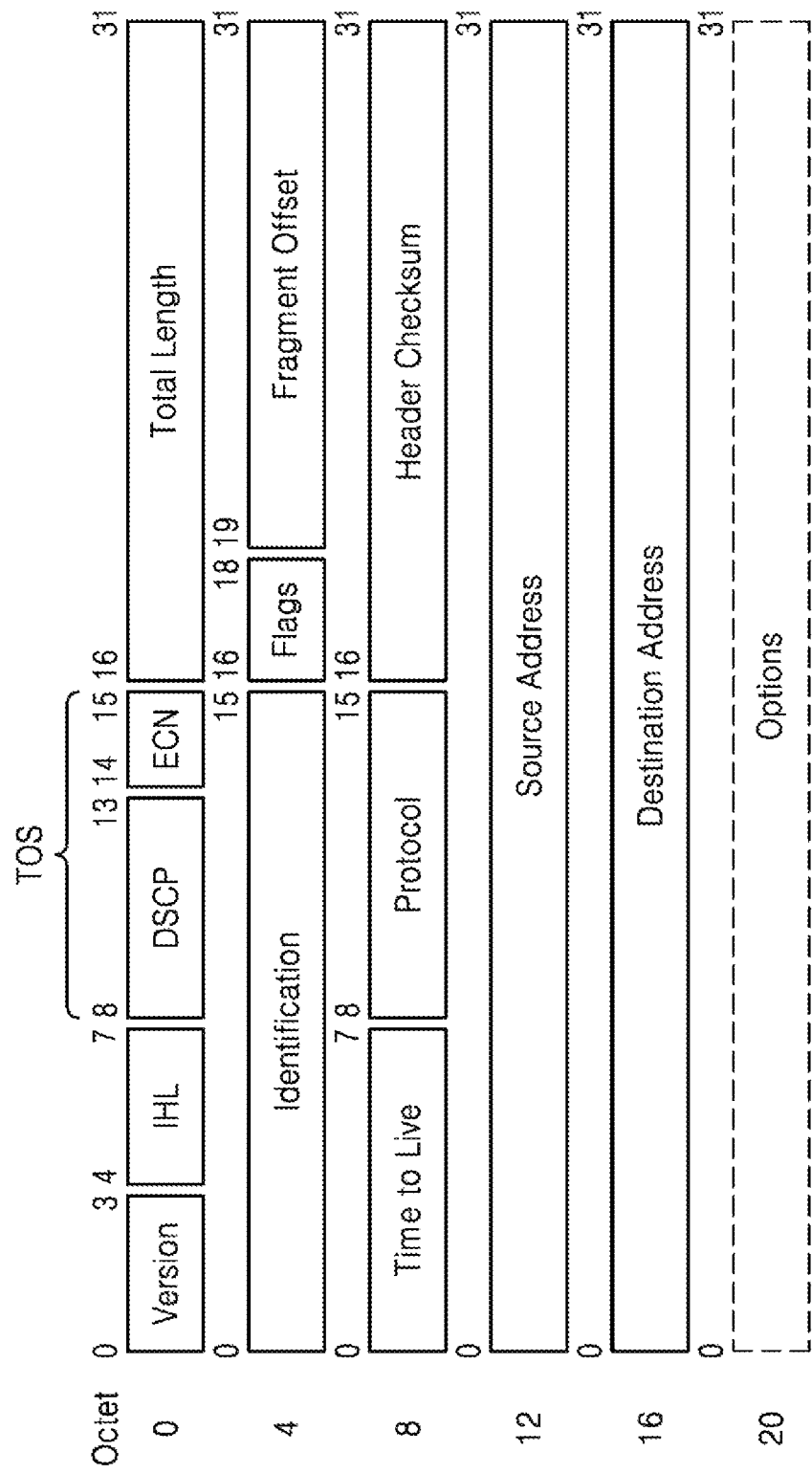
FIG. 5 illustrates a packet header structure according to IPv4 according to embodiments of the present disclosure.

FIG. 5 illustrates a packet header structure according to IPv4 according to embodiments of the present disclosure.

In IPv4 networks, the Flow Label field does not exist and so a different technique is required. Here, bearer mapping at the donor DU uses the Differentiated Services Code Point (DSCP) field to uniquely identify a bearer. DSCP is a sub field within the Type of Service (TOS) field, comprising 6 bits. The other sub field within TOS is Explicit Congestion Notification (ECN) comprising 2 bits.

FIG. 5 shows a representation of the header of a data packet according to IPv4. The 8 bits which form TOS, comprising DSCP and ECN are shown.

In a further embodiment, a combination of data stored in the DSCP and ECN fields is used to uniquely identify a bearer.

It should be noted that this technique is not restricted only to IPv4 networks but is particularly useful in the absence of the Flow Label field, which is found in IPv6.

In a still further embodiment, instead of being used to identify a bearer, data stored in the ECN field is used to indicate one or more of:

Priority—this packet should be prioritized in cases of congestion

Low priority—this packet can be dropped if needed

QoS class—signifying a level of QoS assigned to the packet

Randomizing flow—this packet can go via any available path for this destination

Redundancy—duplicate this packet

In the above list, a reference to packet includes all packets in one bearer or a group of bearers (as appropriate), since packets in these scenarios will necessarily be handled together.

In a still further embodiment, mapping at the donor DU uses the DS/DSCP field to group multiple bearers together for transmission over the same BH RLC channel (N:1 mapping). Furthermore, this mapping may be performed on the basis of QoS requirements. Here, all bearers having the same or similar QoS are grouped together, since they will then be routed identically and so will experience the same QoS.

When the DS/DSCP field or TC/TOS field is used to group together multiple bearers, then the Flow Label field (present in IPv6) may be used to indicate one or more of:

Priority—this packet should be prioritized in cases of congestion

Low priority—this packet can be dropped if needed

QoS class—signifying a level of QoS assigned to the packet

Randomizing flow—this packet can go via any available path for this destination

Redundancy—duplicate this packet

In an embodiment, as mentioned, the Flow Label field is used to uniquely id a bearer. A further refinement is to use DS/DSCP or TC/TOS field to indicate one or more of:

Priority—this packet should be prioritized in cases of congestion

Low priority—this packet can be dropped if needed

QoS class—signifying a level of QoS assigned to the packet

Randomizing flow—this packet can go via any available path for this destination

Redundancy—duplicate this packet

In an embodiment, there is provided a method of bearer mapping at the donor DU whereby the Flow Label field is used to group multiple bearers over the same BH RLC channel and whereby the grouping (N:1 mapping) is performed based on QoS requirements, as mentioned previously. In this case, the TC/TOS or DS/DSCP field can indicate one or more of:

Priority—this packet should be prioritized in cases of congestion

Low priority—this packet can be dropped if needed

QoS class—signifying a level of QoS assigned to the packet

Randomizing flow—this packet can go via any available path for this destination

Redundancy—duplicate this packet

A reserved value in the DS/DSCP, ECN or TC/TOS field is used to indicate which particular embodiment described above is in use i.e. which field in the header includes which information.

In a further embodiment, intermediate nodes in the IAB network follow the same procedures as those specified for the Donor DU set out above. This can be enabled by inserting the full information from the DS/DSCP field and/or Flow Label field into the BAP header. It can also be enabled by inserting a subset of the information from the DS/DSCP field and/or Flow Label field into the BAP header, e.g. just the bearer ID or just the additional information, as required.

This method of configuring the BAP header assumes that the Flow Label field (plus any additional info) is set by the donor CU and copied into the BAP header. The donor CU configures the donor DU and all intermediate nodes on what the Flow Label field (plus additional info) in the BAP header represents.

In a further embodiment, the donor DU (based on the Flow Label field plus any additional info) configures the additional information for the BAP header based on the mapping information.

In a further embodiment, the donor CU configures the donor DU and all intermediate nodes with additional information (which can change from node to node), which is mapped to bearer ID contained in the BAP header at the intermediate nodes.

Although a few preferred embodiments of the present disclosure have been shown and described, it will be appreciated by those skilled in the art that various changes and modifications might be made without departing from the scope of the disclosure, as defined in the appended claims.

Figure 6:
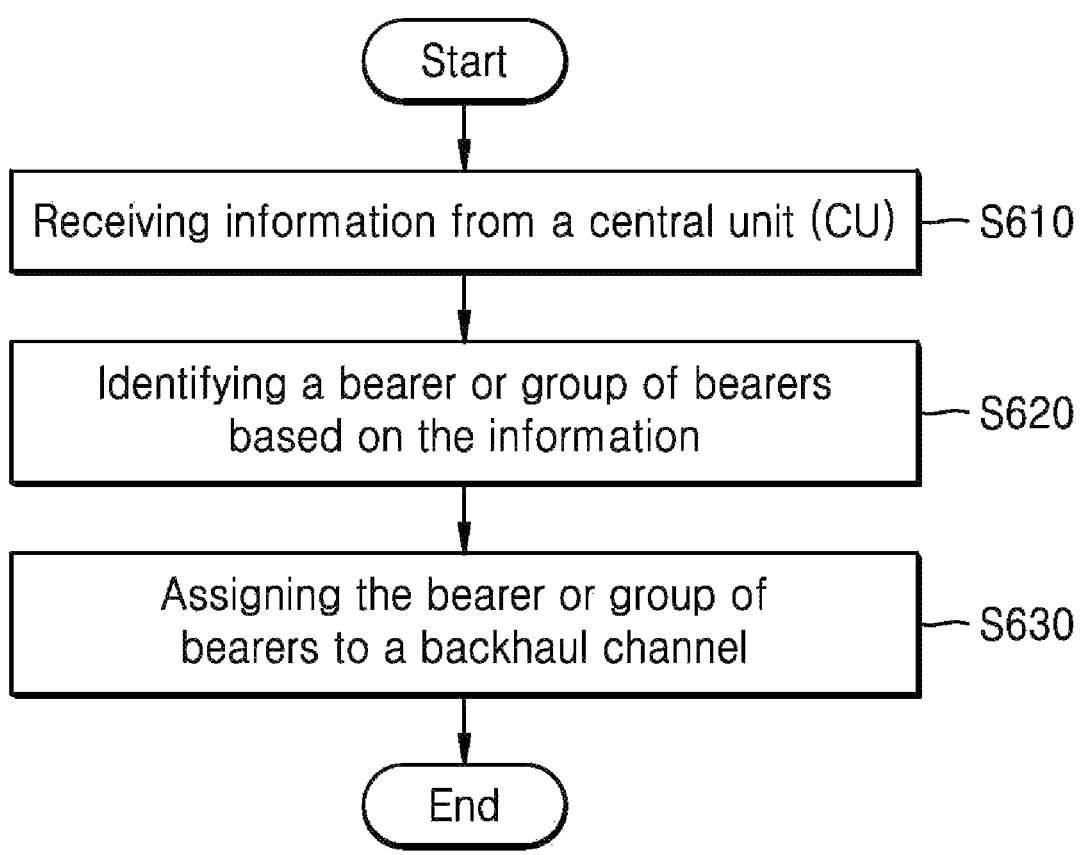
FIG. 6 illustrates a flow chart of the distributed unit (DU) according to embodiments of the present disclosure.

FIG. 6 illustrates a flow chart of the distributed unit (DU) according to embodiments of the present disclosure.

Since the detailed operation of the DU has been described above, repetitive content will be omitted in the following description.

The DU 320 may be included in the base station. For example, the DU 320 may be IAB-donor DU or the donor DU. The DU 320 may be included in the base station. In an embodiment, the DU 320 may be included in the in an Integrated Access and Backhaul (IAB) network.

At step S610, the DU 320 may receive information from an associated central unit (CU). In this case, the CU may be associated with the DU.

In an embodiment, the information includes at least one of flow label or DS information. For example, the flow label may mean IPv6 Flow Label.

In an embodiment, the information may be transferred included in a message.

In an embodiment, the DU 320 may be included in a donor base station (BS)(for example, donor gNB). Also, the associated CU may be included in the donor gNB.

At step S620, the DU 320 may identify a bearer or group of bearers based on the information.

In an embodiment, the information received from the CU 310. Also, the information may be included in a packet header. For example, the information may be IP header information.

In an embodiment, the information included in a packet header (or IP header information) may include at least one information of Flow Label field, Differentiated Services (DS) field, Differentiated Services Code Point (DSCP) field, Traffic Class (TC) field or Explicit Congestion Notification (ECN) field in a packet.

In an embodiment, the bearer or the group of bearers may be identified based on a GTP (GPRS Tunnelling Protocol) tunnel ID of the bearer.

In an embodiment, the bearer or the group of bearers are identified based on at least one of information of Flow Label field, Differentiated Services (DS) field, Differentiated Services Code Point (DSCP) field, Traffic Class (TC) field or Explicit Congestion Notification (ECN) field in a packet.

At step S630, the DU may assign the bearer or group of bearers to a backhaul channel.

In an embodiment, the backhaul channel corresponds to the BH RLC channel.

Figure 7:
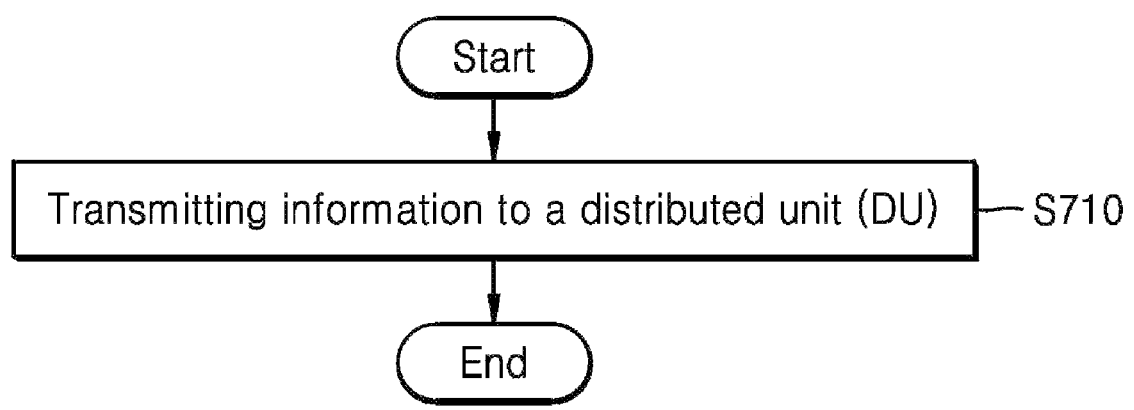
FIG. 7 illustrates a flow chart of the central unit (CU) according to embodiments of the present disclosure.

FIG. 7 illustrates a flow chart of the central unit (CU) according to embodiments of the present disclosure.

Since the detailed operation of the CU has been described above, repetitive content will be omitted in the following description.

The CU may be included in the base station. For example, the CU may be IAB-donor CU or the donor CU. The CU may be included in the base station. In an embodiment, the CU may be included in the in an Integrated Access and Backhaul (IAB) network.

At step S710, The CU may transmit information to a distributed unit (DU)

In an embodiment, a bearer or group of bearers may be identified based on the information.

In an embodiment, the bearer or group of bearers may be assigned to a backhaul channel.

In an embodiment, the bearer or the group of bearers may be identified based on a GTP(GPRS Tunnelling Protocol) tunnel ID of the bearer.

In an embodiment, the information may be included in a packet header.

In an embodiment, the bearer or the group of bearers may be identified based on at least one of information of Flow Label field, Differentiated Services (DS) field, Differentiated Services Code Point (DSCP) field, Traffic Class (TC) field or Explicit Congestion Notification (ECN) field in a packet.

In an embodiment, the DU and CU may be included in a donor base station (BS) in an integrated access and backhaul (IAB) network.

Figure 8:
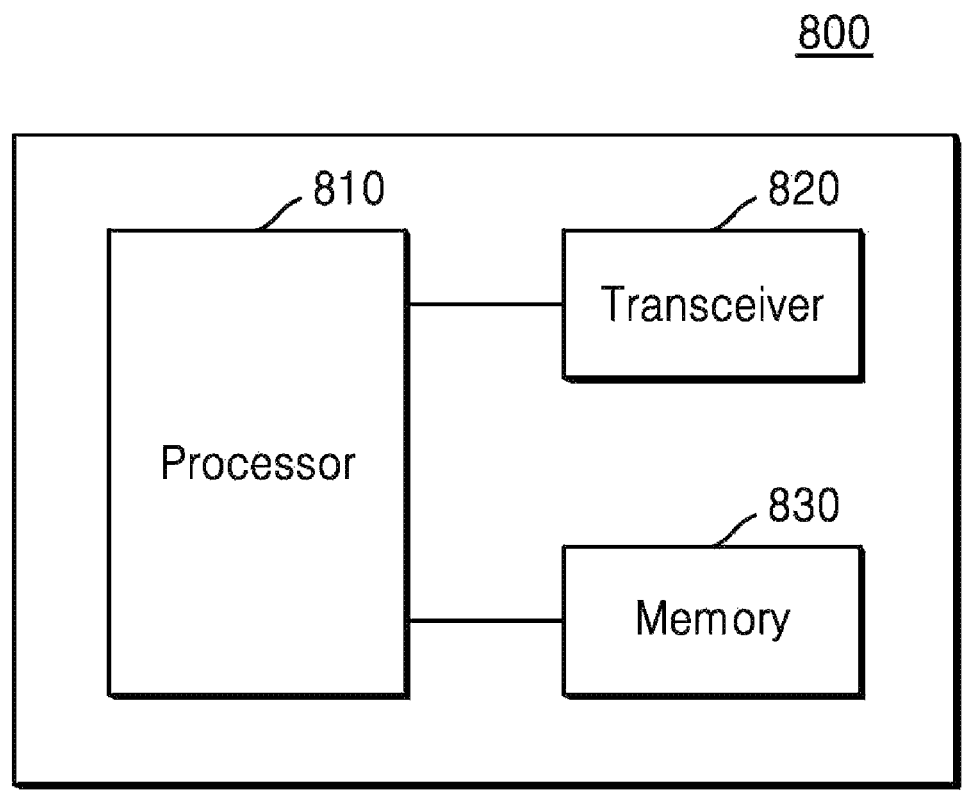
FIG. 8 schematically illustrates a block diagram of a base station according to embodiments of the present disclosure.

FIG. 8 schematically illustrates a block diagram of a base station according to embodiments of the present disclosure.

In an embodiment, the base station 800 may correspond to the gNB 300.

Referring to the FIG. 8, the base station 800 may include a processor 810, a transceiver 820 and a memory 830. However, all of the illustrated components are not essential. The base station 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the provided proposed function, process, and/or method. Operation of the base station 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the base station 800. The memory 830 may be connected to the processor 810 and store at least one instruction or a protocol or a parameter for the provided proposed function, process, and/or method. The memory 830 may include read-only memory (ROM) and/or random access memory (RAM) and/or hard disk and/or CD-ROM and/or DVD and/or other storage devices.

In an exemplary embodiment, the base station 800 may transmit a registration accept message to the UE.

Figure 9:
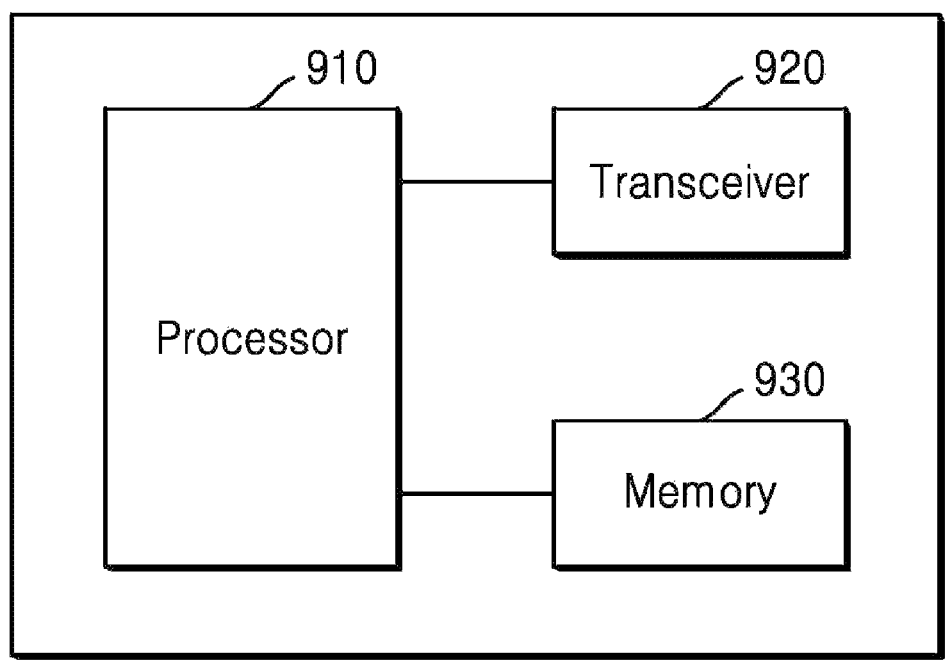
FIG. 9 illustrates a block diagram of the central unit (CU) according to embodiments of the present disclosure.

FIG. 9 illustrates a block diagram of the central unit (CU) according to embodiments of the present disclosure.

In an embodiment, the CU 9000 may be included in the base station 800. In an embodiment, the CU 900 may correspond to the CU 310.

Referring to the FIG. 9, the CU 900 may include a processor 910, a transceiver 920 and a memory 930. However, all of the illustrated components are not essential. The CU 900 may be implemented by more or less components than those illustrated in FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the provided proposed function, process, and/or method. Operation of the CU 900 may be implemented by the processor 910.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the CU 900. The memory 930 may be connected to the processor 910 and store at least one instruction or a protocol or a parameter for the provided proposed function, process, and/or method. The memory 930 may include read-only memory (ROM) and/or random access memory (RAM) and/or hard disk and/or CD-ROM and/or DVD and/or other storage devices.

In an embodiment, the processor 910 may be configured to transmit information to a distributed unit (DU); and wherein a bearer or group of bearers is identified based on the information; and wherein the bearer or group of bearers is assigned to a backhaul channel.

In an embodiment, the bearer or the group of bearers may be identified based on a GTP(GPRS Tunnelling Protocol) tunnel ID of the bearer.

In an embodiment, the information may be included in a packet header.

In an embodiment, the bearer or the group of bearers may be identified based on at least one of information of Flow Label field, Differentiated Services (DS) field, Differentiated Services Code Point (DSCP) field, Traffic Class (TC) field or Explicit Congestion Notification (ECN) field in a packet.

In an embodiment, wherein the DU and CU may be included in a donor base station (BS).

Figure 10:
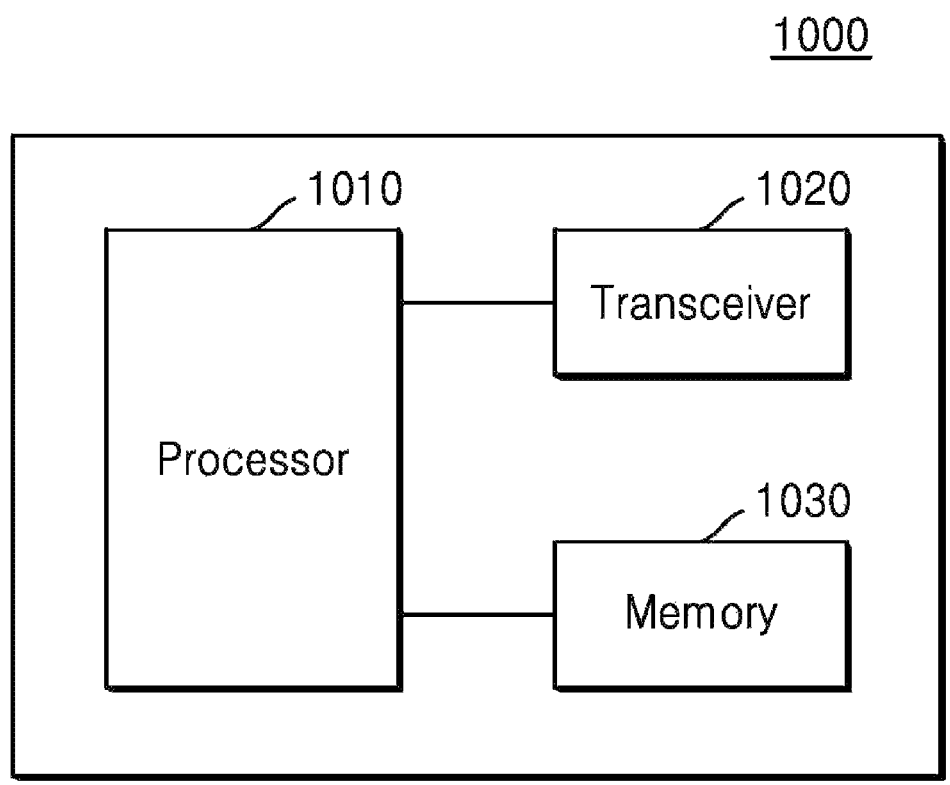
FIG. 10 illustrates a block diagram of the distributed unit (DU) according to embodiments of the present disclosure.

FIG. 10 illustrates a block diagram of the distributed unit (DU) according to embodiments of the present disclosure.

In an embodiment, the DU 1000 may be included in the base station 800. In an embodiment, the DU 1000 may correspond to the DU 320.

Referring to the FIG. 10, the DU 1000 may include a processor 1010, a transceiver 1020 and a memory 1030. However, all of the illustrated components are not essential. The DU 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the provided proposed function, process, and/or method. Operation of the DU 1000 may be implemented by the processor 1010.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the DU 1000. The memory 1030 may be connected to the processor 1010 and store at least one instruction or a protocol or a parameter for the provided proposed function, process, and/or method. The memory 1030 may include read-only memory (ROM) and/or random access memory (RAM) and/or hard disk and/or CD-ROM and/or DVD and/or other storage devices.

In an embodiment, the processor 1010 may be configured to receive information from a central unit (CU), identify a bearer or group of bearers based on the information, and assign the bearer or group of bearers to a backhaul channel.

In an embodiment, the processor 1010 may be configured to identify the bearer or the group of bearers based on a GTP(GPRS Tunnelling Protocol) tunnel ID of the bearer.

In an embodiment, wherein the information is included in a packet header.

In an embodiment, the processor 1010 may be configured to identify the bearer or the group of bearers based on at least one of information of Flow Label field, Differentiated Services (DS) field, Differentiated Services Code Point (DSCP) field, Traffic Class (TC) field or Explicit Congestion Notification (ECN) field in a packet.

In an embodiment, the DU may be included in a donor base station (BS).

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a distributed unit (DU) in a wireless communication system, the method comprising:
   receiving, from a central unit (CU), configuration information including information related to an internet protocol (IP) header and information related to a backhaul channel; and
   mapping at least one bearer to the backhaul channel based on the configuration information, wherein in case that a downlink traffic is transferred by an IPV6 packet, the information related to the IP header includes information about differentiated services (DS) of the downlink traffic, and information about an IPV6 flow label of the downlink traffic.

2. The method of claim 1,
wherein the information related to the IP header includes an IP address.

3. The method of claim 1, further comprising:
transmitting the downlink traffic on the backhaul channel,
wherein the DU and the CU are included in a donor base station (BS) in an integrated access and backhaul (IAB) network.

4. The method of claim 1, further comprising:
identifying a backhaul radio link control (RLC) channel based on the information related to the backhaul channel,
wherein mapping the at least one bearer to the backhaul channel comprises:
    mapping between the at least one bearer and the backhaul RLC channel based on the configuration information.

5. A distributed unit (DU), the DU comprising:
a transceiver; and
at least one processor coupled with the transceiver and configured to:
    receive, from a central unit (CU), configuration information including information related to an internet protocol (IP) header and information related to a backhaul channel; and
    map at least one bearer to the backhaul channel, based on the configuration information,
    wherein in case that a downlink traffic is transferred by an IPV6 packet, the information related to the IP header includes information about differentiated services (DS) of the downlink traffic, and information about an IPV6 flow label of the downlink traffic.

6. The DU of claim 5,
wherein the information related to the IP header includes an IP address.

7. The DU of claim 5,
wherein the at least one processor is further configured to:
transmit the downlink traffic on the backhaul channel, and
wherein the DU and the CU are included in a donor base station (BS) in an integrated access and backhaul (IAB) network.

8. The DU of claim 5, wherein the at least one processor is further configured to:
    identify a backhaul radio link control (RLC) channel based on the information related to the backhaul channel; and
    map between the at least one bearer and the backhaul RLC channel based on the configuration information.

9. A method performed by a central unit (CU) in a wireless communication system, the method comprising:
    transmitting, to a distributed unit (DU), configuration information including information related to an internet protocol (IP) header and information related to a backhaul channel,
    wherein at least one bearer is mapped to the backhaul channel based on the configuration information, and
    wherein in case that a downlink traffic is transferred by an IPV6 packet, the information related to the IP header includes information about differentiated services (DS) of the downlink traffic, and information about an IPV6 flow label of the downlink traffic.

10. The method of claim 9,
wherein the information related to the IP header includes an IP address.

11. The method of claim 9,
wherein the DU and the CU are included in a donor base station (BS) in an integrated access and backhaul (IAB) network.

12. The method of claim 9,
wherein the at least one bearer is mapped to a backhaul RLC channel based on the configuration information.

* * * * *